July 9, 1940.   J. WORLATSCHEK   2,207,211
NEGATIVE CARRIER FOR ENLARGERS
Filed Jan. 8, 1940   2 Sheets-Sheet 1
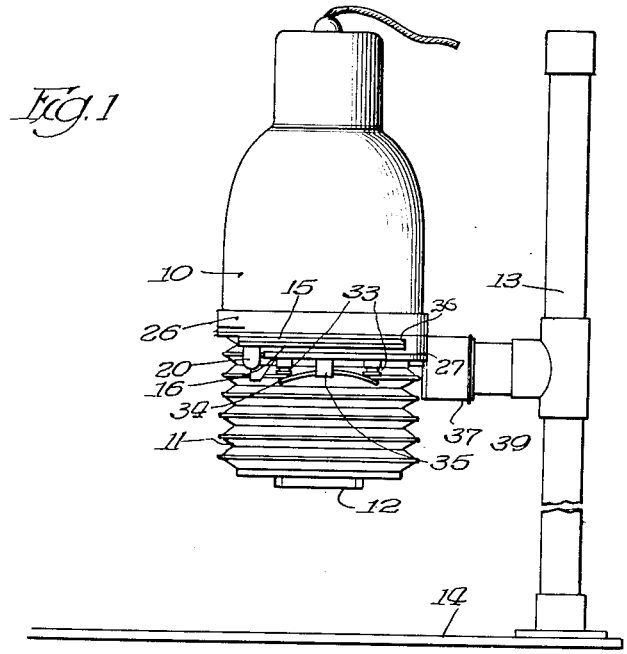
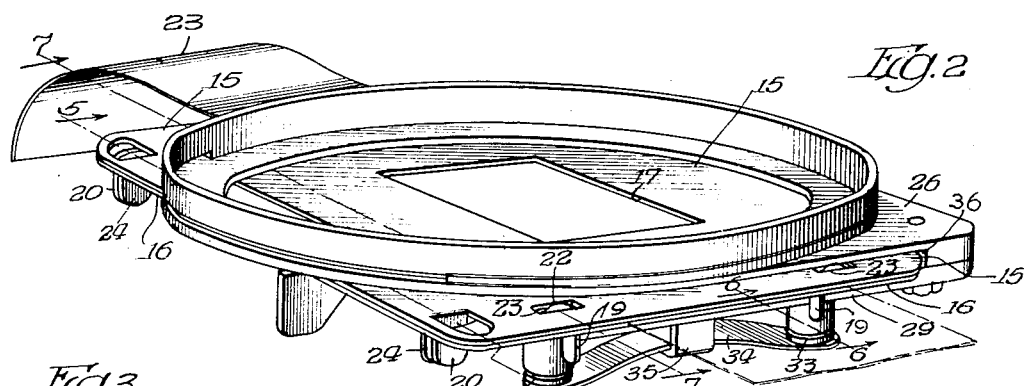
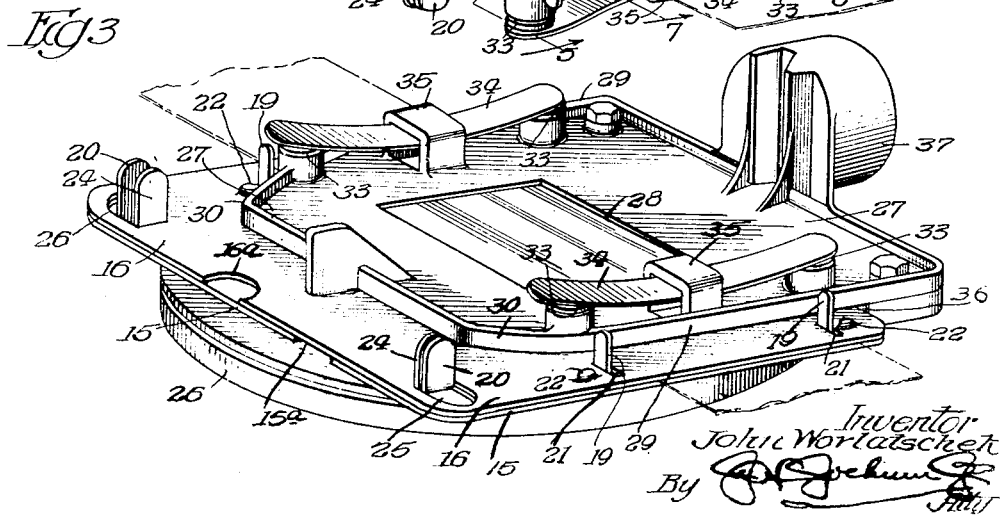
Inventor
John Worlatschek
By

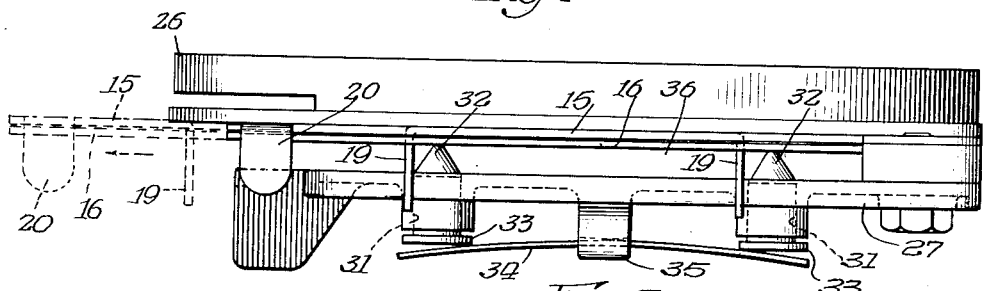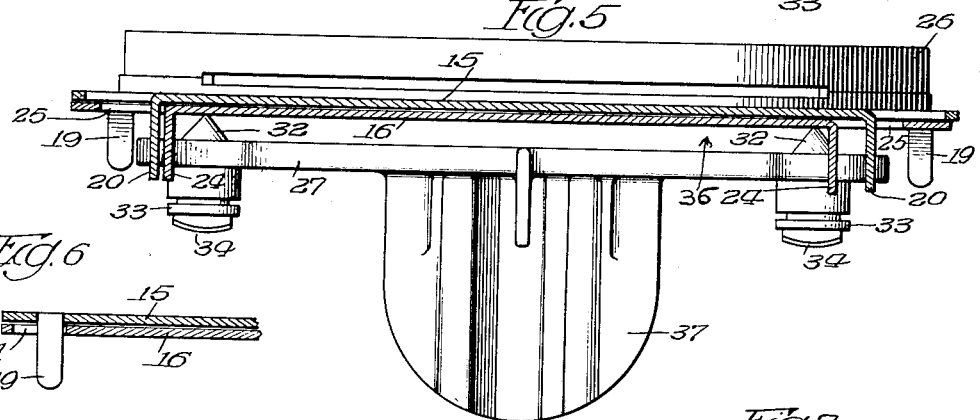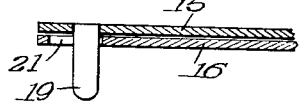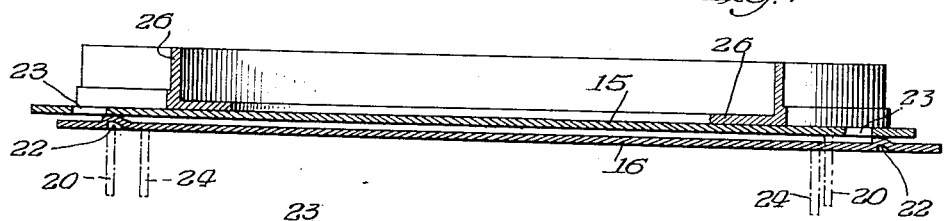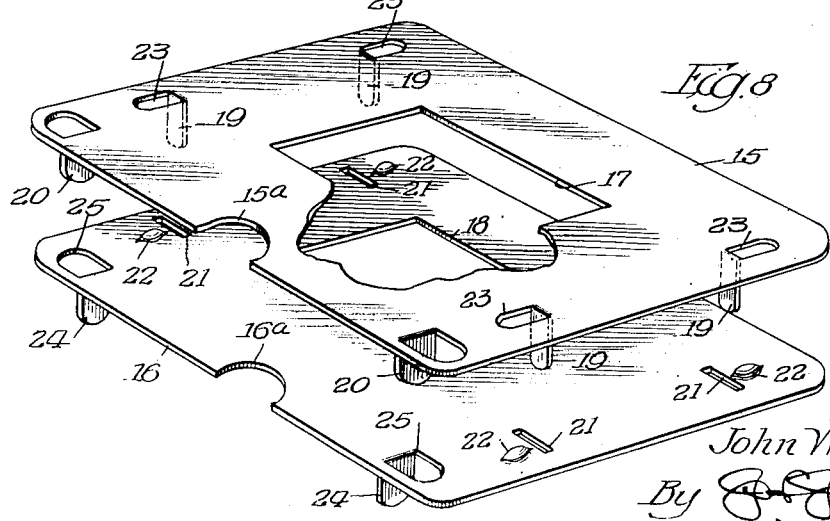

Patented July 9, 1940

2,207,211

UNITED STATES PATENT OFFICE 2,207,211

NEGATIVE CARRIER FOR ENLARGERS

John Worlatschek, Chicago, Ill., assignor to Burke & James, Inc., Chicago, Ill., a corporation of Illinois Application January 8, 1940, Serial No. 312,939

6 Claims. (Cl. 88—24)

This invention relates to improvements in negative carriers for photographic enlarging cameras or apparatus and one of the objects of the invention is to provide an improved carrier of this character which will permit the change of the position of the negative or film without necessitating the removal of the film carrier or the enlarging apparatus or camera.

A further object is to provide an improved carrier of this character which embodies two apertured plates or members between which the film or negative is placed and which latter will be held in position by clamping or forcing the plates together, the plates being also held together and removably clamped in position with respect to the enlarger.

Means are provided for separating the plates sufficiently to release the film or negative, so that it may be advanced or retracted between the plates and with respect to the exposure openings therein, and at the same time maintaining the plates separated so that the film or negative can be thus adjusted or positioned.

A further object is to provide an improved carrier of this character which will be simple, durable and inexpensive to manufacture and effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a side elevation of one form of enlarging apparatus having a negative carrier constructed in accordance with the principles of this invention attached thereto.

Figure 2 is a detail perspective view from the top side of the negative carrier.

Figure 3 is a perspective view from the bottom side of the negative carrier.

Figure 4 is a side elevation taken from the right hand side of Figure 2 showing in dotted lines some of the parts in adjusted position.

Figure 5 is a detail sectional view taken on line 5—5 Figure 2.

Figure 6 is a detail sectional view on an enlarged scale, taken on line 6—6 Figure 2.

Figure 7 is a detail sectional view taken on line 7—7 Figure 2.

Figure 8 is a detail perspective view showing the two plates of the negative carrier separated from each other.

Referring more particularly to the drawings, the numeral 10 designates any form of photographic enlarging apparatus provided with the usual bellows 11 and the lens 12.

The negative carrier is removably secured in position between the bellows 11 and the body 10 of the camera and the entire mechanism may be supported in any suitable manner such as by means of a standard 13 mounted upon a base 14.

The negative carrier consists essentially of two plates or members 15—16 provided respectively with exposure apertures 17—18 that are adapted to register with each other. The plate 15 is provided with struck out portions 19 to form ears or extensions that are deflected laterally with respect to the plate and when the plate is held in a horizontal position, depend for a substantial distance from the plate.

This plate is also provided with struck out portions 20 that are also deflected laterally with respect to the plate and when the plate is horizontal, depend therefrom for a substantial distance to provide finger-grip portions, for a purpose to be set forth.

The projections or formations 19 are preferably arranged so that their widest dimension is transverse to the widest dimension of the projections or formations 20.

The plate 16 is provided with slots 21 positioned so that when the plates 15—16 are placed in contact with each other, face to face, the extensions or formations 19 will enter the slots 21 and the slots 21 are of a length greater than the widest dimension of the projections or formations 19 so as to permit the plates 15—16 to be moved relatively one with relation to the other; the slots 21 co-operating with the projections 19 serving to maintain the plates 15—16 in such position with respect to each other that the exposure openings or apertures 17—18 will be in register.

Provided on the plate 16 are also formations 22 so shaped as to provide cam surfaces and these formations 22 are so arranged that when the plates 15—16 are in contact with each other and in predetermined relative positions the cams or formations 22 will enter the openings 23 in the plate 15 that are formed by striking out the projecting portions 19. When the plates are so positioned that these formations 22 enter the respective openings 23 the plates will be in close proximity to each other to clamp the negative or film 23 which is disposed therebetween.

The plate 16 is also provided with struck out portions 24 similar to struck out portions 20 on the plate 15 and these are so positioned that when the plate 15 is in contact with the plate 16 and the formations 20 pass through openings 25 in the plate 16 which are formed by striking out the portions 24, the extensions or formations 20 will stand in proximity to the formations 24 on the plate 16 as shown more clearly in Figure 2.

The formations 20 are so arranged with respect to the formations 24 that when one of the formations 20 is in close proximity to the respective formations 24 the other formations 20—24 will be separated from the other as shown in Figures 3 and 5, so that by gripping the formations 20—24 which are separated from each other they will be drawn together and the other formations 20—24 will be separated.

When the parts are in the position shown in Figure 2 the cams 22 will enter the openings 23 in the plate 15. When, however, the formations 20—24 which are spaced from each other are gripped and pressed together the portion of the plate 15 forming the edges of the openings 23 will ride upon the cams 22 and the plates will be separated by raising the plate 15 with respect to the plate 16.

When the plates 15—16 are relatively moved in the opposite direction the portion of the plate 15 which is raised upon the cams 22 will ride therefrom and the plate 15 will drop down against the plate 16 as the openings 23 will be in alinement with the cams 22 so that the cams may enter such openings.

The numeral 26 designates generally a holder for the film carrier and this holder may constitute a portion of or may be attached to the body 10 of the enlarging apparatus. The holder is provided with a spaced portion or wall 27 having an opening 28 therein into alinement or register with which the openings 17—18 will be disposed when the carrier is placed in the holder. The portion 27 constitutes a wall spaced from the body 26 of the holder and into which space the negative carrier is adapted to be placed. The wall 27 is of such a configuration that the projections or formations 19 on the plate 15 will co-operate with the side walls 29 thereof and serve as a means for assisting in guiding and positioning the carrier within the holder. A portion of the side walls 29 may be beveled or inclined as at 30 if desired, so as to facilitate the insertion of the carrier into the holder.

Supported by the wall 27 of the holder are pins or lugs 31 which slide loosely in bearings in the wall so as to project therethrough and extend into the space between the wall 27 and the body 26 of the holder. If desired, these pins may be tapered as at 32 and may be provided with a head 33 to limit the inward movement of the pins.

Any number of these pins may be provided but they are preferably arranged in pairs and disposed behind each pair of pins so as to contact the heads 33 thereof is a spring 34, preferably of the leaf type, the ends of which engage and rest against the heads 33 of the respective pins 31. These springs may be anchored or secured in position in any suitable manner preferably by passing under a yoke shaped element or portion 35 carried by the wall 27. The stress of the springs 34 is such that the pins 31 are normally forced in a direction across or into the space 36.

In use the carrier is detached from the holder and the plates 15—16 are separated. The negative or film is then laid across one of the plates and the other plate is placed in position so that the negative or film will be clamped between the plates, and between the projection 19 so that it will be properly positioned with respect to the openings 17—18 in the respective plates. The holder is then inserted into the opening 36 until the forward edge of the holder contacts the beveled extremities 32 of the pins 31, the plate being positioned by means of the projections 19 contacting the edges 29 of the wall 27. By then forcing the holder further inwardly the pins 31 will yield against the stress of the springs 34 and the holder may then be shoved fully into position within the opening 36.

The pressure of the pins 31 under the stress of the springs 34 against one of the plates will force the other plate against the body 26 of the holder and the negative carrier will then be yieldingly clamped in position and the negative or film will also be clamped between the plates against movement.

After an exposure has been taken and it is desired to change position or shift the film with respect to the carrier, the depending or respective pairs of lugs or formations 20—24 such for instance as the pair shown at the right of Figure 5, may then be gripped between the fingers of the operator and the lugs of this pair forced together. This will cause a relative movement between the plates 15—16 and will cause the cams 22 to be moved out of the respective openings 23 in the plate 15 with the result that the plate 15 will ride upon the cams 22 as shown more clearly in Figure 7, to separate the plates a sufficient distance to permit the negative or film to be freely slid between the plates.

The plates will be held in this position by the pressure of the pins 31 against the plate 16 under the stress of the spring 34.

During the movement of the plates in this direction the co-operating lugs or projections 20—24 on the other side of the plate will be separated so that after the film or negative has been adjusted it is only necessary to grasp the separate lugs on the opposite side of the plate and draw them together. This will cause the plate 15 to ride off of the cams 22 and the pressure of the springs 34 and pins 31 will force the plate 15 against the plate 16 to clamp the film or negative, the openings 23 in the plate 15 being then moved into a position to permit the plates to thus clamp the negative by reason of the fact that the openings 23 will be above the cams 22 so that the cams can enter such openings and thereby allow the plates to be moved one towards the other.

The numeral 37 designates a socket on the holder or enlarging apparatus for the reception of an arm or bracket which latter is supported by the standard 13.

If desired and in order to provide a means to facilitate the separation of the plates 15 and 16 when they are not within the holder so that the film or negative may be readily placed therebetween, the plates may be respectively provided with cutaway portions 15—A and 16—A in one edge thereof, and these cutaway portions may be offset one with respect to the other.

While the preferred form of the invention has been herein shown and described, it is to be understood that various changes may be made in the details of construction and in the combination and arrangement of the several parts within the scope of the claims, without departing from the spirit of this invention.

What is claimed as new is:

1. A negative carrier of the character described embodying two plates provided with registering exposure apertures and between which plates the negative is to be clamped, means for yieldingly clamping the plates together, means for relatively shifting said plates edgewise one with relation to the other, and means located on the plates and movable one against the other in response to such edgewise shifting movement for laterally separating the plates whereby to permit the negative to slide freely between said plates.

2. A negative carrier of the character described embodying two plates having registering exposure apertures and between which plates the negative is to be clamped, said plates adapted for relative movement, means yieldingly holding the plates in clamping relation with respect to each other, means for guiding the plates during their relative movements, and means operating to separate the plates when they are relatively moved in one direction whereby to permit the negative to slide freely therebetween, said clamping means operating when the plates are relatively moved in the opposite direction, to restore to the plates their clamping relation, the said separating means for the plates embodying an inclined surface on one of the plates into and out of engagement with which a portion of the other plate is adapted to be moved.

3. A negative carrier of the character described embodying two plates relatively movable edgewise and having registering exposure apertures and between which plates the negative is to be clamped, means yieldingly holding said plates in clamping relation, means tending normally to yieldingly maintain the plates in clamping relation, means for guiding the plates during their relative movements, means on the plates and operating to separate the plates when they are relatively moved in one direction whereby to permit the negative to slide freely therebetween, said clamping means operating when the plates are relatively moved in the opposite direction, to restore to the plates their clamping relation, and a holder into which said carrier is adapted to be inserted, the said yielding clamping means being associated with said holder and separate from the negative carrier, said plate being separable to release the negative while the carrier is within the said holder.

4. A negative carrier of the character described embodying two plates having registering exposure openings and between which plates the negative is disposed, said plates adapted to be moved edgewise one with relation to the other, means for guiding the plates in such movement, a holder for receiving the plates, resilient means carried with said holder and engaging one of the plates and co-operating with a wall of said holder for yieldingly clamping the plates together, and means carried by the plates and engaging each other by such relative edgewise movement of the plates for separating the plates against the stress of said resilient means and while they are in said holder.

5. A negative carrier of the character described embodying two plates having relative movement, said plates being provided with registering exposure apertures and between which plates the negative is to be clamped, means for yieldingly clamping the plates together, means for relatively shifting said plates edgewise one with relation to the other, and means on the plates and operating during such edgewise shifting movement to laterally separate the plates whereby to permit the negative to slide freely between said plates, the said means for relatively shifting the plates edgewise embodying formations on the plates disposed in shiftable and parallel relation.

6. A negative carrier of the character described embodying two plates having relative movement, said plates being provided with registering exposure apertures and between which plates the negative is to be clamped, means for yieldingly clamping the plates together, means for relatively shifting said plates edgewise one with relation to the other, and means located on the plates and operating during such edgewise shifting movement to laterally separate the plates whereby to permit the negative to slide freely between said plates, the said means for relatively shifting the plates edgewise embodying formations on the plates disposed in shiftable and parallel relation, the formation on one of the plates extending through an elongated opening in the other plate.

JOHN WORLATSCHEK.